(12) United States Patent
Krupka et al.

(10) Patent No.: US 10,460,201 B2
(45) Date of Patent: Oct. 29, 2019

(54) STRUCTURE AND TRAINING FOR IMAGE CLASSIFICATION

(71) Applicant: Microsoft Technology Licensing, LLC, Redmond, WA (US)

(72) Inventors: Eyal Krupka, Shimshit (IL); Aharon Bar Hillel, Kiryat-Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 14/985,803

(22) Filed: Dec. 31, 2015

(65) Prior Publication Data
US 2017/0193328 A1 Jul. 6, 2017

(51) Int. Cl.
*G06K 9/00* (2006.01)
*G06K 9/62* (2006.01)
*G06K 9/66* (2006.01)
*G06F 16/583* (2019.01)

(52) U.S. Cl.
CPC ....... *G06K 9/6212* (2013.01); *G06F 16/5838* (2019.01); *G06F 16/5854* (2019.01); *G06K 9/6269* (2013.01); *G06K 9/6296* (2013.01); *G06K 9/66* (2013.01)

(58) Field of Classification Search
None
See application file for complete search history.

(56) References Cited

U.S. PATENT DOCUMENTS

2015/0138078 A1* 5/2015 Krupka .............. G06K 9/00389
345/156

OTHER PUBLICATIONS

Kumpka et al., "Discriminative ferns ensemble for hand pose recognition", 2014 IEEE CVPR 2014 (Year: 2014).*
International Search Report and the Written Opinion dated May 3, 2017 From the International Searching Authority Re. Application No. PCT/US2016/067896. (13 Pages).

* cited by examiner

*Primary Examiner* — Soo Jin Park (57) ABSTRACT

A computer implemented method of training an image classifier, comprising: receiving training images data labeled according to image classes; selecting reference points of the images; and constructing a set of voting convolutional tables and binary features on a patch surrounding each reference point by performing, for each calculation stage: creating a voting table by: creating first candidate binary features; calculating a global loss reduction for each first candidate binary feature; selecting one first candidate binary feature having minimal global loss reduction; and repeating to select stage-size binary features; and performing a tree split using the voting table by: creating second candidate binary features; calculating a combined loss reduction for each stage-split size group of the second candidate binary features; selecting one of the groups having a maximal combined loss reduction; and creating a child-directing table using the selected binary features.

20 Claims, 4 Drawing Sheets

STRUCTURE AND TRAINING FOR IMAGE CLASSIFICATION

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (spplication Ser. No. 14/985,691), "MULTIMODAL INTERACTION USING A STATE MACHINE AND HAND GESTURES DISCRETE VALUES" (spplication Ser. No. 14/985,716), "RECOGNITION OF HAND POSES BY CLASSIFICATION USING DISCRETE VALUES" (spplication Ser. No. 14/985,741), "TRANSFORM LIGHTWEIGHT SKELETON AND USING INVERSE KINEMATICS TO PRODUCE ARTICULATE SKELETON" (application Ser. No. 14/985,777), "TRANSLATION OF GESTURE TO GESTURE CODE DESCRIPTION USING DEPTH CAMERA" (application Ser. No. 14/985,804), "GESTURES VISUAL BUILDER TOOL" (application Ser. No. 14/985,775), "ELECTRICAL DEVICE FOR HAND GESTURES DETECTION" (application Ser. No. 14/985,728) and "DETECTION OF HAND GESTURES USING GESTURE LANGUAGE DISCRETE VALUES" (application Ser. No. 14/985,680), the disclosures of which are incorporated herein by reference.

BACKGROUND

Practical object recognition problems often have to be solved under severe computation and time constraints. Some examples of interest are natural user interfaces, automotive active safety, robotic vision or sensing for the Internet of Things (IoT). Often the problem is to obtain high accuracy in real time, on a low power platform, or in a background process that may only utilize a small fraction of the central processing unit (CPU). In other cases the classifier is part of a cascade, or a complex multiple-classifier system. Various architectures have been suggested and/or used to optimize the accuracy-speed trade-off.

SUMMARY

According to some embodiments of the present disclosure, there are provided systems and methods for image classification based on convolutionally-applied sparse feature extraction, using a combination of trees and ferns, and a linear voting layer. An image classifier is trained using training images data and then used for sorting sample images received from a capture device.

When classifying an image, multiple codewords are created for each reference point in the image by concatenation of binary features. A vote is calculated for each codeword to each class, and the class having the highest sum of vote is selected for the image. The creation of the codeword is done by a method combining the use of ferns and trees structure of calculating binary features, referred to as 'long tree'. Calculation is divided into multiple stages, each defining a set of bit functions and split size (number of binary features to be calculated) and a child-directing table. Several binary features are calculated for one stage and then used with the child-directing table as an index for the next stage. When all binary features are calculated, they are combines to form a codeword.

When training the classifier, a method is used that iterates between gradient based word calculator optimization and global optimization of table weights. The training includes selecting reference points in the training images data which is labeled according to classes, and constructing binary features on a patch surrounding each reference point. The binary features are constructed by steps of two kinds: fern growing and tree split. At fern growing, candidate binary features are randomly generated, the global loss reduction for each of them is computed (using a linear approximation of the loss) and the best is retained. At tree split again candidate bit features are randomly generated, but this time a set of several bit functions are selected as children with a child-directing table that gives the maximal value of combined loss reduction for this stage.

The described method provides improved speed to accuracy ratio over existing methods of image classification. The method is most beneficial when implemented in systems requiring accurate results using limited computing resources and/or in a very short time, for example 1-1000 CPU microseconds. Such exemplary systems include, for example, user interfaces that are operated by identifying a user's hand poses and/or motions captured by camera, automotive active safety that recognizes road objects and motions and robotic vision that has to classify objects in its surroundings.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

According to some embodiments of the present disclosure, there are provided systems and methods for classifying images under classification time constraints, using Convolutional Tables Ensemble (CTE) architecture for object category recognition. The architecture is based on convolutionally-applied sparse feature extraction, using a combination of trees or ferns, and a linear voting layer. The combination of trees and ferns structures of calculating binary features, also referred to as bit functions, is done by splitting the ferns into stages. This is referred to as 'long tree'. To train the long tree classifier, the maximal global loss reduction is calculated to select the split and bit functions.

The fastest theoretical classifier possible would be the one concatenating all the pixel values into a single index, and then using this index to access a table listing the labels of all possible images. This is not feasible due to the exponential requirements of memory and training set size, so the presented architecture, also referred to as Convolutional Tables Ensemble (CTE), compromises this limit idea in two main ways: first, instead of encoding the whole image with a single index, the image is treated as a dense set of patches where each patch is encoded using the same parameters. This is analogous to a convolutional layer in a convolutional neural network (CNN), where the same set of filters is applied at each image position. Second, instead of describing a patch using a single long index, it is encoded with a set of short indices, that are used to access a set of reasonable-size tables. Votes of all tables at all positions are combined linearly to yield the classifier outputs. Variants of this architecture have been used successfully mainly for classification of depth images.

The idea of applying the same feature extraction on a dense locations grid is very old and influential in vision, and is a key tenet in CNNs, the state-of-the-art in object recognition. It provides a good structural prior in the form of translation invariance. Another advantage lies in enhanced sample size for learning local feature parameters, since these may be trained from (number of training images)×(number of image patches) instances. The presented architectures are not deep in the CNN sense, and correspond to a single convolutional layer, followed by spatial pooling.

The main vessel used for obtaining high classification speed is the utilization of table-based feature extractors, instead of heavier computations such as applying a large set of filters in a convolutional layer. In table-based feature extraction, the patch is characterized using a set of fast bit functions, such as a comparison between two pixels. K bits are extracted and concatenated into a word. This word is then used as an index into a set of weight tables, one per class, and the weights extracted provide the classes support from this word. Support weights are accumulated across many tables and all image positions, and the label is decided according to the highest scoring class.

The power of this architecture is in the combination of fast-but-rich features with a high capacity classifier. Using K, for example 12 quick bit functions, the representation considers all their $2^K$ combinations as features. The representation is highly sparse, with $$\frac{1}{2^K}$$

of the features active at each position. The classifier is linear, but it operates over numerous highly non linear features. For M tables, for example 50 tables, and C classes, the number of weights to optimize is $M2^KC$, which may be very high even for modest values of M, K, C. The architecture hence requires a large training set to be used, and it effectively trades training sample size for speed and accuracy.

Pushing the speed-accuracy envelope using this architecture requires making careful structural and algorithmic choices. First, bit functions and image preprocessing should be chosen. Simple functions were tried, which were suitable for depth images, and they were extended using gradient and color based channels and features. Another type of bit function introduced is spatial bits stating the rough location of the patch, which enable to combine global and local pooling. A second important choice is between conditional computation of bit functions, leading to tree structures and unconditional computation as in fern structures. While trees may enable higher accuracy, ferns are better suited for vector processing (such as Streaming SIMD Extensions (SSE) instructions) and thus provide significant speed advantages. It was explored between these ends empirically using a 'long tree' structure, whose configuration enables testing intermediate structures.

Several works have addressed the challenges of learning a tables-based classifier, and they vary in optimization effort from extremely random forests to global optimization of table weights and greedy forward choice of bit functions. The presented approach builds on previous approaches and extends them with new possibilities. The table ensemble is learnt by adding one table at a time, using a framework similar to the 'anyboost' algorithm. Training iterates between minimizing a global convex loss, differentiating this loss with regard to examples, and using these gradients to guide construction of the next table. For the global optimization, two main options are presented: a support vector machine (SVM) loss and a softmax loss as commonly used in CNN training. For the optimization of the bit function parameters in a new fern/tree, several options were developed: forward bit selection, iterative bit replacement, and iterative local refinement. In some cases, such as the threshold parameters of certain bits, an algorithm providing the optimal solution is suggested.

Since CTEs may be much faster than CNNs, while the latter excel at accuracy, it is desirable to merge their advantages when possible. In several recent studies, the output of an accurate but computationally expensive classifier is used to train another classifier, with a different and often computationally cheaper architecture. This technique, termed distillation, is used to train a CTE classifier with a CNN teacher, with encouraging results on the MNIST data.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1A:
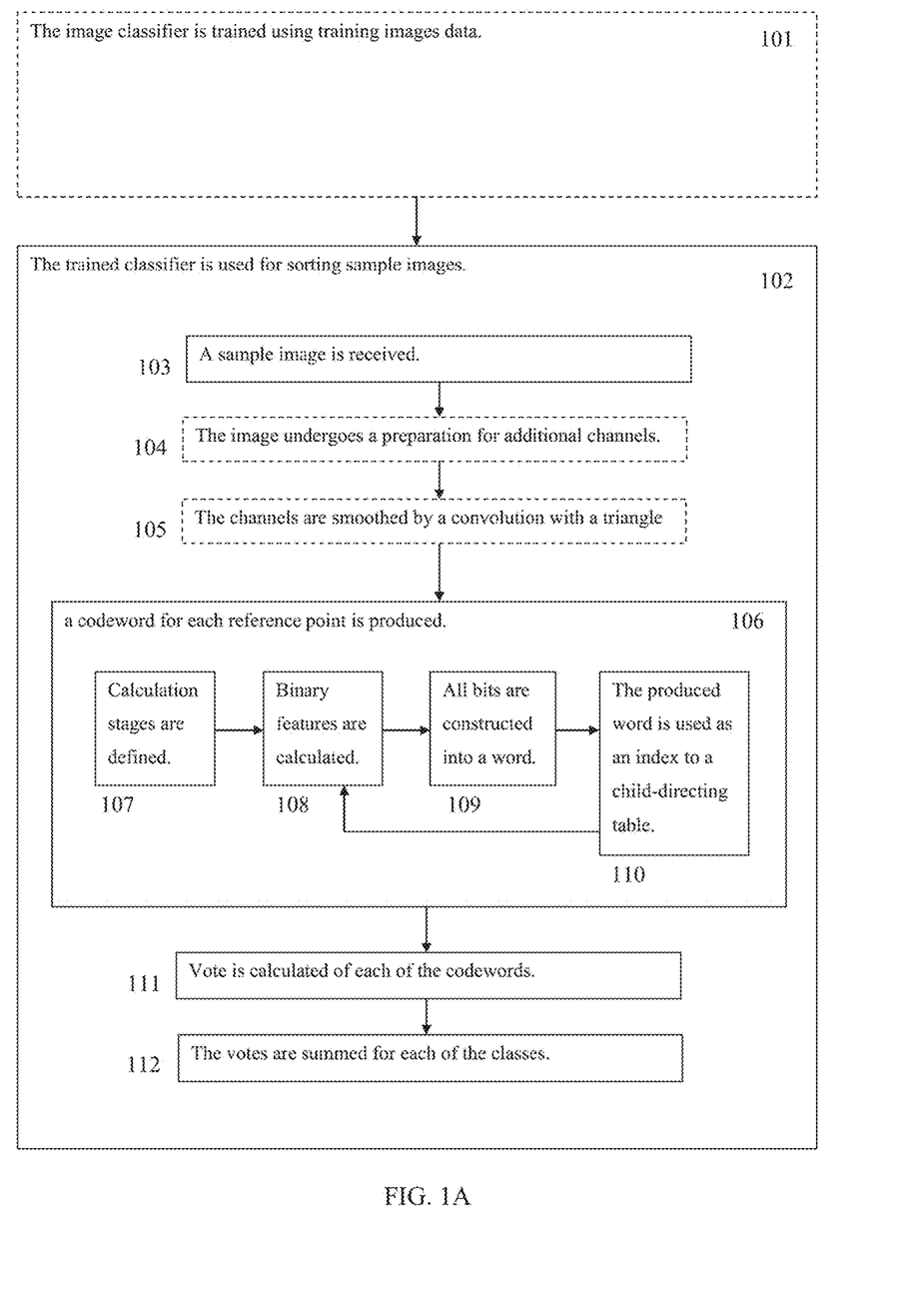
FIGS. 1A and 1B illustrate a flowchart of an exemplary process for training an image classifier and classifying images, according to some embodiments of the present disclosure.
Figure 1B:
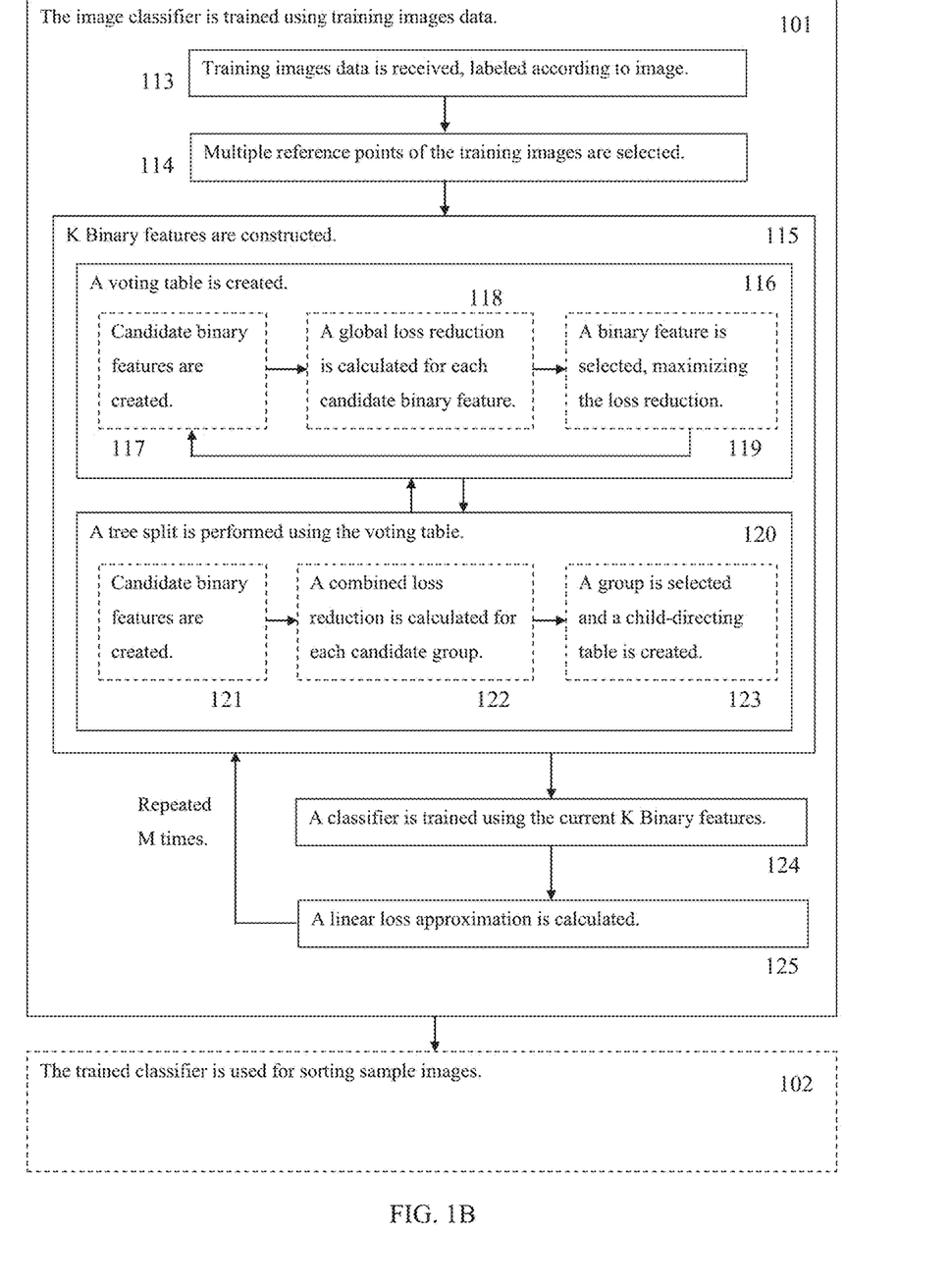

Referring now to the drawings, FIGS. 1A and 1B illustrate a flowchart of an exemplary process for training an image classifier and classifying images, according to some embodiments of the present disclosure. First, the image classifier is trained using training images data, as shown at 101. Then, the trained classifier is used for sorting sample images received from a capture device, as shown at 102.

Figure 2:
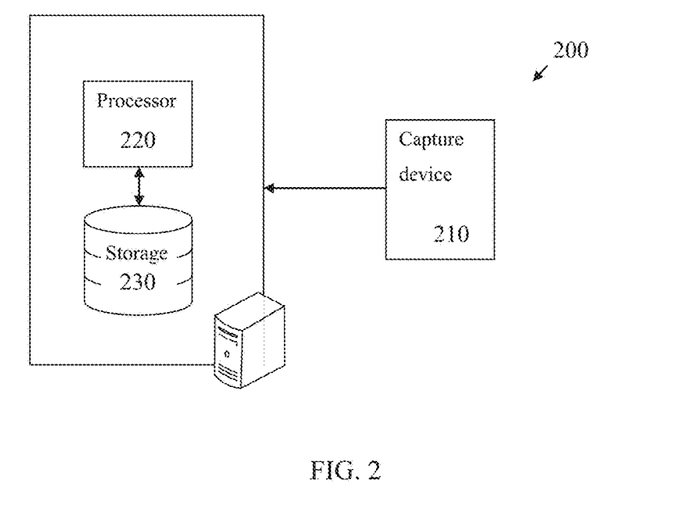
FIG. 2 is a schematic illustration of an exemplary system for classifying images, according to some embodiments of the present disclosure.

Reference is also made to FIG. 2, which is a schematic illustration of an exemplary system for classifying images, according to some embodiments of the present disclosure. An exemplary system 200 includes a capture device 210 for capturing at least one image, one or more hardware processor(s) 220 and a storage medium 230 for storing the code instructions of the classifier. System 200 may be included in on one or more computerized devices, for example, computer, mobile device, computerized machine and/or computerized appliance equipped and/or attached to capture device 210. Storage medium 230 may include, for example, a digital data storage unit such as a magnetic drive and/or a solid state drive. Storage medium 230 may also be, for example, a content delivery network or content distribution network (CDN) is a large distributed system of servers deployed in multiple data centers across the Internet.

First, the process of classification by the classifier is presented. A convolutional table ensemble is a classifier $f: I \rightarrow \{1, \ldots, C\}$ where $I \in \mathbb{R}^{S_x \times S_y \times D}$ and C is the number of classes.

As shown at 103, a sample image is received by processor 220 from capture device 210. Capture device 210 may include, for example, color camera(s), depth camera(s), stereo camera(s), infrared (IR) camera(s), a motion detector, a proximity sensor and/or any other imaging device or combination thereof that captures visual signals.

Optionally, the sample image includes multiple channels. The channels may include, for example, gray scale and color channels, or depth and infra-red (IR) (multiplied by a depth-based mask) for depth images.

Optionally, as shown at 104, the image I may undergoes a preparation stage where additional feature channels ('maps') may be added to it, so it is transformed to $I^e \in \mathbb{R}^{S_x \times S_y \times D_e}$ with $D_e \geq D$. Exemplary additional channels include:

Gradient-based channels: Two kinds of gradient maps are computed from the original channels. A normalized gradient channel includes the norm of the gradient for each pixel location. In oriented gradient channels the gradient energy of a pixel is softly quantized into $N^O$ orientation maps.

Integral channels: Integral images of channels from the previous two forms. Applying integral channel bits to these channels allows fast calculation of channel area sums.

Spatial channels: Two channels stating the horizontal and vertical location of a pixel in the image. These channels state the quantized location, using $N^H = \lfloor \log_2 S_x \rfloor$ and $N^V = \lfloor \log_2 S_y \rfloor$ bits respectively.

Optionally, as shown at 105, after preparation, the channels are smoothed by a convolution with a triangle filter. Spatial channels enable the incorporation of patches' position in the word computed. They are used with a 'Get Bit l' bit function type, with l referring to the higher bits. This effectively puts a spatial grid over the image, thus turning the global summation pooling into local summation using a pyramid-like structure. For example using two bit functions, checking for the $N^H$-th horizontal bit and the $N^V$-th vertical bit, effectively puts a 2×2 grid over the image where words are summed independently and get different weights for each quarter. Similarly using 4 spatial bits one gets a 4×4 pyramid, etc. Enforcing a different number of spatial bits in each convolutional table may improve feature diversity and consequently the accuracy.

Then, as shown at 106, a codeword is produced for each reference points of the image. The codeword is constructed from binary features, also referred to as bit functions. A bit function is applied on pixels from a patch surrounding the reference point and produces a single bit. Word calculators compute an index descriptor of a patch $P \in \mathbb{R}^{l \times l \times D_e}$ by applying K bit functions, each producing a single bit. Each such function is composed of a simple comparison operation, with a few parameters stating its exact operation. Exemplary bit function forms include:

One pixel: $F(P) = \sigma(P(x, y, d) - t)$
Two pixels: $F(P) = \sigma(P(x_1, y_1, d) - P(x_2, y_2, d) - t)$
Get Bit l: $F(P) = (P(0, 0, d) << l) \& 1$
Integral channel bit: $F(p) = \sigma(P(x_1, y_1, d) - P(x_1, y_2, d) - P(x_2, y_1, d) + P(x_2, y_2, d) - t)$ where $\sigma$ is the Heaviside step function. The first two bit function types may be applied to any input channel $d \in \{1, \ldots, D_e\}$, while the latter two are meaningful only for specific channels.

For an image location $p = (x; y) \in \{1, \ldots, S_x\} \times \{1, \ldots, S_y\}$, its neighborhood is denoted by N(p), and the patch centered at location p is denoted by $I_{N(p)}$. A word calculator is a feature extractor applied to such a patch and returning a K-bit index, i.e. a function $W: \mathbb{R}^{l \times l \times D_e} \rightarrow \{0,1\}^K$, where l is the neighborhood size. In a classifier there are M calculators denoted by $B^m = B(\bullet; \Theta^m)$ where $m = 1, \ldots, M$ and $\Theta^m$ are the calculator parameters. The calculator computes its output by applying K bit-functions to the patch, each producing a single bit.

The structure of the word calculator is a combination of ferns architecture and tree hierarchy architecture. The main design decision in this respect is the choice between ferns and trees. Ferns include only K bit functions, so the number of parameters is relatively small and over-fitting during local optimization is less likely. Trees are a much larger hypothesis family with up to $2^K - 1$ bit functions in a full tree. Thus they are likely to enable higher accuracy, but also be more prone to overfit. This trade-off is explored using a 'long tree' structure enabling a gradual interplay between the fern and full tree extremes.

First, as shown at 107, calculation stages are defined, each defining a stage size number of bits to include in the tree stage, and a stage split factor determining the number of children of the node. In a long tree the K bits to compute are divided into $N^s$ stages, with $K_s$ bits computed at stage $s = 1, \ldots, N^s$, so $$\sum_{s=1}^{N^S} K_s = K.$$

A tree of depth $N^s$ is built, where a node in stage s contains $K_s$ bit functions computing a $K_s$-bits word. A node in stage $s = 1, \ldots, N^s - 1$ has $q_s$ children, and it has a child-directing table of size $2^{K_s}$, with entries containing child indices in $1, \ldots, q_s$.

Then, as shown at 108, split size number of binary features are calculated on a patch surrounding the reference point. Computation starts at stage 1 at a root node and computes the $K_s$ bits in a node.

Then, as shown at 109, all $K_s$ bits are constructed into a word.

Finally, as shown at 110, the produced word is used as an index to the child-directing table, whose output is the index of the child node to descend to. The tree structure is determined by the vectors $(K_1, \ldots, K_{N^s})$ and $(q_1, \ldots, q_{N^s-})$ of stage size and stage split factors respectively.

This is repeated for all calculation stages to produce all K bits.

When speed is considered, an important point is that ferns may be efficiently implemented using vector operations (like SSE), constructing the word in several locations at the same time. The efficiency arises because computing the same bit function for several contiguous patches involves access to contiguous pixels, which may be done without expensive gather operations. Conversely, for trees different bit functions are applied at contiguous patches so the accessed pixels are not contiguous in memory. Therefore, trees may be more accurate, but ferns provide considerably better accuracy-speed trade-off.

As shown at 111, a vote is calculated of each of the codewords to each of the classes according to a weight matrix. This is done by convolutional table which sums the votes of a word calculator over all pixels in an aggregation area. Each word calculator is applied to all locations in an integration area, and each word extracted casts votes for the C output classes. Convolutional table m is hence a triplet $(B^m, A^m, W^m)$ where $A^m \subset \{1, \ldots, S_x\} \times \{1, \ldots, S_y\}$ is the integration area of word calculator $B^m$, and $W^m \in M_{C \times 2^K}$ is its weight matrix. The word calculated at location p is denoted by $b_p^m = B(I_{N(p)}^e; \Theta^m)$. A histogram $H^m = (H_0^m, \ldots, H_{2^K-1}^m)$ is gathered, counting word occurrences; i.e., $$H_b^m = \Sigma_{p \in A^m} \delta(b_p^m - b) \quad (1)$$

with the discrete delta function. The class support of the convolutional table is the C-element vector $W^m (H^m)^t$.

As shown at 112, the votes are summed for each of the classes to determine a classification of the image. The ensemble sums the votes of M convolutional tables. The ensemble classification is done by accumulating the class support of all convolutional tables into a linear classifier with a bias term. Let $=[H^1, \ldots, H^M]$, and $W=[W^1, \ldots, W^M] \in \mathbb{R}^{C \times M 2^K}$ The classifier's decision is given by $$C^* = \underset{c}{\mathrm{argmax}} \, W H^t - T^t \quad (2)$$

where $T=(T^1, \ldots, T^C)$ is a vector of class biases. The following algorithm shows the classifier's test time flow:

Classification input: An image I of size $S_x \times S_y \times D$, classifier parameters $(\Theta^m, A^m, W^{m,c}, T^c)_{m=1,c=1}^{M,C}$
$A^m \in \{1, \ldots, S_x\} \times \{1, \ldots, S_y\}$, $W^{m,c} \in \mathbb{R}^{2^K}$, $T^c \in \mathbb{R}$
Classification output: A classifier decision in $\{1, \ldots, C\}$
Initialization: For $c=1, \ldots, C$ Score[c]=$-T^c$
Prepare extended image $I^e \in \mathbb{R}^{S_x \times S_y \times D}$
For all tables $m=1, \ldots, M$
For all pixels $p \in A^m$
Compute $F = B(I_{N(p)}^e; \Theta^m) \in \{0,1\}^K$
For $c=1, \ldots, C$ Score[c]=Score[c]+$W^{m,c}$[F]

Return $\underset{c}{\mathrm{argmax}} \, \mathrm{Score}[c]$

Note that the histograms $H^m$ are not accumulated in practice, and instead each word computed directly votes for all classes.

Figure 3:
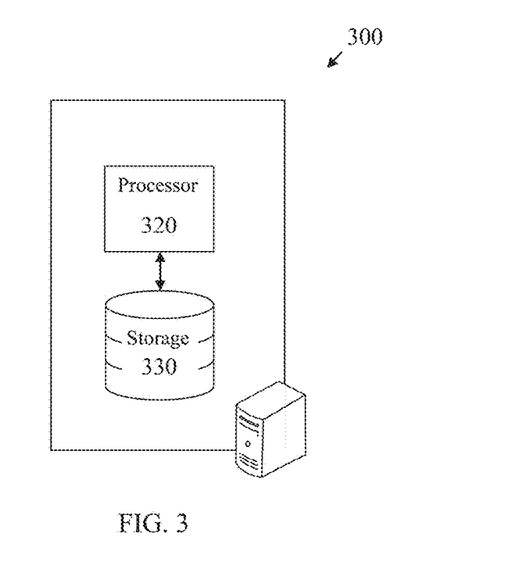
FIG. 3 is a schematic illustration of an exemplary system for training an image classifier, according to some embodiments of the present disclosure.

Reference is now made to FIG. 3, which is a schematic illustration of an exemplary system for training an image classifier, according to some embodiments of the present disclosure. An exemplary system 300 includes one or more hardware processor(s) 320, as described above, and a storage medium 330, as described above, for storing the code instructions and the training images data.

First, as shown at 113, training images data, labeled according to image classes is received and stored in storage medium 330. The training images data may be received, for example, from standardized image databases, such as MNIST, CIFAR-10, SVHN and/or 3-HANDPOSE.

Then, as shown at 114, multiple reference points of the training images data are selected.

In some previous publications, instances of convolutional tables ensemble were discriminatively optimized for specific tasks and losses, for example hand pose recognition using SVM and/or face alignment using $l^2$ regression. The main idea behind these methods is to iterate between solving a convex problem for a fixed representation, and augmenting the representation based on gradient signals from the obtained solution. The method presented here adapt these ideas to linear M-classification with an arbitrary $l^2$-regularized convex loss function. Assume a labeled training sample with fixed representation $\{(H_i, y_i)\}_{i=1}^N$ where $H_i \in \mathbb{R} \, m2^K$, $y_i \in \{1, \ldots, C\}$, and denote the c-th row of the weight matrix W by $W_c$. It is desired to learn a linear classifier of the form $C^* = \mathrm{arg}\,\mathrm{max}_c s^c$ with $s^c = W_c H^t - T^c$ by minimizing a sample loss function of the form $$L(\{H_i, y_i\}_{i=1}^N) = \frac{1}{2}\|W\|^2 + \sum_{i=1}^N l(\{s_i^c\}_{c=1}^C, y_i) \quad (3)$$

with $l(\{s^c\}_{c=1}^C, y)$ a convex function of $s^c$. L is strictly convex with a single global minimum, hence solvable using known techniques. Once the problem has been solved for the fixed representation $H_i$, the representation may be extended by incorporating a new table, effectively adding $2^K$ new features. In order to choose the new features wisely, it is considered how the loss changes when a new feature $f^+$ is added to the representation with small class weights, regarded as a small perturbation of the existing model.

The value of a new feature candidate for example i is denote by $f_i^+$. After incorporating the new feature, example i's representation changes from $H_i$ to $H_i^+ = [H_i, f_i^+]$ and weights vectors $W_c$ are augmented to $[W_c, w_c^+]$ with $w_c^+ \in \mathbb{R}$. Class scores $s_i^c$ are updated to $s_i^{c,+} = W_c^+ (H_i^+)^t - t^c = s_i^c + w_c^+ f^+$. Finally, the loss is changed to $$L^+ = L(\{H_i^+, y_i\}_{i=1}^N) = \frac{1}{2}\|W\|^2 + \frac{1}{2}\sum^{Cc=1} w_c^{+2} + \sum_{i=1}^N l(\{s_i^{c,+}\}_{c=1}^C, y_i).$$

The new weights vector is denoted $W^+ = [w_1^+, \ldots, w_C^+]$. Assuming that the new feature is added with small weights; i.e., $w_c^+ \leq \epsilon$ for all c. $L^+$ may be Taylor approximated around $W^+ = 0$, with the gradient $$\left. \frac{dL^+}{dW^+} \right|_{W^+=0} :$$

$$\left. \frac{dL^+}{dW^+} \right|_{w^+=0} = w^+ + \sum_{i=1}^N \left. \frac{dl(\{s_i^{c,+}\}, y_i)}{ds_i^c} f_i^+ \right|_{w^+=0} = \sum_{i=1}^N \frac{dl(\{s_i^c\}, y_i)}{ds_i^c} f_i^+ \quad (4)$$

Using the gradient in a Taylor approximation of $L^+$ gives $$L^+ = L + W^+ \left(\frac{dL^+}{dW^+}\right)^t + O(\|W^+\|^2) = \quad (5)$$

-continued $$L + \sum_{c=1}^{C} w_c^+ \sum_{i=1}^{N} \frac{dl(\{s_i^c\}, y_i)}{ds_i^c} f_i^+ + O(\|W^+\|^2)$$

Denote $$g_i^c = \frac{dl(\{s_i^c\}, y_i)}{ds_i^c}.$$

For loss minimization, $$\sum_{c=1}^{C} w_c^+ \sum_{i=1}^{N} g_i^c f_i^+$$

should be minimized over $W^+$ and $f^+$. For fixed $f^+$ minimizing over $W^+$ is simple. Denoting $$R^c(f^+) = \sum_{i=1}^{n} g_i^c f_i^+, \sum_{c=1}^{C} w_c^+ R^c(f^+)$$

has to be minimized under the constraint $w_c^+ \leq \epsilon$, $\forall c$. Each term may be minimized in the sum independently to get $w+$, $copt = -\epsilon \operatorname{sign}(R^c)$, and the value of the minimum is $$-\epsilon \sum_{c=1}^{C} |R^c(f^+)|.$$

Hence, for a single feature addition, maximizing the score $$\sum_{c=1}^{C} |R^c(f^+)|$$

is needed.

$2^K$ features are added at once, generated by a new word calculator B. The derivation above may be done for each of them independently, so for the addition of the features $\{H_b^+\}_{b \in \{0,1\}^K}$ it is $$L^+ \approx L - \sum_{b \in \{0,1\}^K} -\epsilon \sum_{c=1}^{C} |R^c(H_b^+)| = \qquad (6)$$

$$L - \epsilon \sum_{c=1}^{C} \sum_{b \in \{0,1\}^K} \left| \sum_{i=1}^{N} g_i^c \sum_{p \in A^+} \delta(b_{i,p}^+ - b) \right| =$$

$$L - \epsilon \sum_{c=1}^{C} \sum_{b \in \{0,1\}^K} \left| \sum_{\{i,p:b_{i,p}^+ = b\}}^{N} g_i^c \right| \stackrel{\Delta}{=} L - \epsilon R(B)$$

where we used Equation 1 for $H_b^+$ and denoted $b_{i,p}^+ = B$ $(I_{i,N(p)})$. The resulting training algorithm iterates between global classifier optimization and greedy optimization of the next convolutional table by maximizing $R(B; \Theta)$. The following algorithm summarizes the training algorithm:

Training input: A labeled training set $S = \{I_i, y_i\}_{i=1}^{N}$, parameters M, K, C, $\{A^m\}_{m=1}^{M}$, convex loss $L(S; W, T)$
Training output: A classifier $(\Theta^m, A^m, W^{m,c}, T^c)_{m=1,c=1}^{M,C}$
Initialization: $g_i^c = 1/|\{I_i | y_i^c = 1\}|$ if $y_i^c = 1$,
$g_i^c = -1/|\{I_i | y_i^c = -1\}|$ if $y_i^c = -1$
Prepare extended image $I^e \in \mathbb{R}^{S_x \times S_y \times D}$
For m=1, ..., M
Table addition: choose $\Theta^m$ to optimize:

$$\Theta^m = \arg\max_{\Theta} \left| \Theta^m = \arg\max_{\Theta} \sum_{c} \sum_{b \in \{0,1\}^K} \left| \sum_{i,p:b_{i,p}(\Theta)} g_i^c \right| \right.$$

Update representation: $\forall_i = 1, \ldots, N$, $b \in \{0,1\}^K$ $$H_b^m[I_i] = \Sigma_p \delta(b_{p,i}^m = b), H = [H, H^m]$$

Global optimization: train W, T to optimize:

$$\arg\min_{W,T} L(\{H_i, y_i\}_{i=1}^{N}; W, T)$$

If m<M get loss gradients:

$$g_i^c = \frac{dL}{dS_i^c}$$

Optionally, forward bit function selection is used for the optimization of $R(B; \Theta)$. In forward selection, we optimize $R(B)$ by adding one bit after the other. For fern growing there are K such stages. At stage $l=1, \ldots, K$, $\{F^j\}_{j=1}^{N_c}$ candidate bit functions are generated, with their type and parameters drawn from a prior distribution. For each j, the current word calculator B is augmented to $B^+ = [B, F^j]$ and the one with the highest score is chosen. However, simple greedy computation of $R(B^+)$ at each stage may not the best way to optimize $R(B)$, and an auxiliary score which additively normalizes the newly-introduced features does a better job. Denote the patch features of a word calculator B by $\delta^b(P) = \delta(B(P) = b)$, by $\delta_{i,p}^b$ the value of $\delta^b$ for pixel p in image i and by $R^c(f(P)) \stackrel{\Delta}{=} \Sigma_{i,p} g_i^c f_{i,p}$ the score R induced by a patch function f. The addition of a new bit effectively replaces the feature $\delta^b$ for $b \in \{0, 2^l - 1\}$ with 2 new features $\delta^{(b,0)}$ and $\delta^{(b,1)}$. when the gradients in cell b are not balanced; i.e., $\Sigma_{i,p} \delta_{imp}^b g_i^c = C_0 \neq 0$, as is often the case, a feature $\delta^{(b,0)}$ may get a good $R^c(\delta^{(b,0)})$ score of $C_0$ even when it is constant, or otherwise uninformative. To handle this, a normalized version of the new features is scored, with an average value of 0, which more effectively measures the added information in the new features. The following lemma shows that this is a valid, as well as computationally effective strategy:

Lemma (1):
Let $$\tilde{\delta}^{(b,u)} = \delta^{(b,u)} - \frac{\#\delta^{(b,u)}}{\#\delta^{(b)}} \delta^b$$

for u=0,1 and $\#\delta^a = \Sigma_{imp}\delta_{i,p}{}^a$. The following properties hold:

1. Using $\bar{\delta}^{(b,u)}$, $\delta^b$ in a classifier is equivalent to using $\delta_{(b,o)}$, $\delta^{(b,1)}$; i.e, for ny weight choice $w_0$, $w_1$ there are $w_b$, $w_\Delta$ such that $w_0\delta^{(b,o)} + w_1\delta^{(b,1)} = w_b\delta^b + w_\Delta\bar{\delta}^{(b,1)}$

2.

$$R^c(\bar{\delta}^{(b,0)}) = R^c(\bar{\delta}^{(b,1)})$$

3.

$$R^c(\bar{\delta}^{(b,0)}) = \sum_{i,p}(g_i^c - E[g_i^c \mid b])\delta^{(b,0)} \text{ with } E[g_i^c \mid b] \triangleq \frac{\sum_{i,p} g_i^c \delta^b}{\#\delta^b}$$

Property 1 shows that $\delta^b$, $\bar{\delta}^{(b,1)}$ features may be scored instead of $\delta^{(b,u)}$ features. Since only $\bar{\delta}^{(b,1)}$ is affected by the new candidate bit, it is possible to score only those terms when selecting among candidates. Property 3 shows that the gradient is normalized instead of the feature candidates, which is cheaper (as there are $N_c$ candidates but only a single gradient vector). In summary, the next bit selection is optimized by maximizing $$R_\Delta([B, F^j]) \triangleq \sum_{c=1}^{C} \sum_{b \in \{0,1\}^l} \left| \sum_{\{i,p:b_{i,p}=(b,1)\}} (g_i^c - E[g_i^c \mid b]) \right| \quad (7)$$

over the choice of $F^j$. The calculation requires a single histogram aggregation sweep over all patches (i, p).

Most of the bit functions obtain their bit by comparing an underlying patch measurement to a threshold t. For such functions, the optimal threshold parameter may be found with a small additional computational cost. This is done by sorting the underlying values of $F^j$ and computing the sum over i, p in Equation 7 by running with the sorted order. This way, a running statistic of the $R_\Delta$ score may be maintained, computing the score for all possible thresholds and keeping the best.

Optionally, for a 'long tree' a similar algorithm is employed, with ferns internal to nodes optimized as full ferns, but tree splits requiring special treatment.

As shown at 115, K binary features are constructed on a patch surrounding each reference point for each calculation stage (nodes). This is done in two steps, fern growing as shown at 116 and tree split as shown in 120.

Fern growing is done, as shown at 116, by iteratively selecting candidate binary features having minimal global loss reduction. A fern with $K_s$ bits is created at stage s. The fern growing is optionally done as shown at 117-119:

First, as shown at 117, multiple candidate binary features are created.

Then, as shown at 118, a global loss reduction is calculated for each of the candidate binary features.

Then, as shown at 119, a binary feature is selected, maximizing the global loss reduction.

Stages 117, 118 and 119 are iterated $K_s$ times to select $K_s$ binary features.

Assuming a node is split in stage s, tree split is performed by selecting a candidate binary features group and creating a child-directing table, as shown at 120. Optionally, the tree split is performed as shown at 121-123:

The current word calculator has already computed a $$L_s = \sum_{i=1}^{s} K_i - \text{bit word},$$

among which $K_s$ were computed in the current node.

First, as shown at 121, $N_C$ candidate binary features are created.

Then, as shown at 122, a combined R loss reduction is calculated for each group of stage-split binary features. A loss reduction matrix M of size $2^K \times N_C$ is built, stating how each candidate contributes to each word of the tree node. Entrée (i, j) includes the loss reduction induced by candidate j to patches mapped to word i.

Then, as shown at 123, one of the groups of binary features, a set of $q_s$ columns $S = \{i_1, \ldots, i_q\}$, is selected which has a maximal value of the combined loss reduction $\Sigma\max M(i, j)$.

Finally, a child-directing table is created using said selected binary features The corresponding $q^s$ bit functions are taken as the first bit functions of the children and the children directing table is built pointing each node word to its best branch.

Since different prefixes of the current calculator B are augmented by different bit functions, the R score has to be decomposed. Denoted by a is the index set $\{L_s - K_s + 1, \ldots, L_s\}$ of bits computed by the current node, and by b(a) the limitation of a binary word b to indices a. For a $K_s$-bit word $z \in \{0,1\}^{K_s}$, we define the component of R contributed by words with b(a)=z by $$R_{b(a)=z}(B) \triangleq \sum_{c=1}^{C} \sum_{b \in \{0,1\}^{L_s}, b(a)=z} \left| \sum_{\{i,p:b_{i,p}=b\}} g_i^c \right| \quad (8)$$

A child-directing table and binary features are selected for the children from the candidate binary features, having a maximal value of combined loss reduction. The first bit functions are chosen of all the children, as well as the redirection table, to optimize R. For the tree split, a large set $\mathbb{F}$ of candidate bits is drawn, and the first bits of the $q_s$ children are chosen by optimizing $$\max_{G \subset \mathbb{F}, |G|=q_s} \sum_{z \in \{0,1\}^{K_s}} \max_{F_z \in G} R_{b(a)=z}([B, F_z]) \quad (9)$$

with G the set of chosen bits for the children and entry z in the redirection table set to the index of the child containing $F_z$. For this optimization we compute the score matrix $S \in \mathbb{M}_{2^{K_s} \times |\mathbb{F}|}$ with $S(i, j) = R_{b(a)=i}([B, F_j])$. Given a choice of G, amounting to a choice of column subset in S, the optimization over $F_z$ is trivial and the score is easy to compute. Optimization is done over G by exhaustively trying all choices of G for |G|=2, and greedily adding columns to G until it contains $q_s$ members.

This is optionally repeated for all calculation stages. For each stage, a classifier is trained using the current trees/ferns (the selected binary features), as shown at 124, and a linear approximation of the loss of the current classifier is computed, as shown at 125. Training then iterates back to constructing binary features for another tree/fern.

Optionally, in addition to forward bit selection, an iterative bit replacement is implemented. While the last bit functions in a fern are chosen to complement the previous ones, the bits chosen at the beginning are not optimized to be complementary and may be suboptimal in a long word calculator. The bit replacement algorithm operates after forward bit selection. It runs over all the bit functions several times and attempts to replace each function with several randomly drawn candidates. A replacement step is accepted when it improves the $R_A(B)$ score.

Optionally, a bit refinement algorithm is implemented. The algorithm attempts to replace a bit function by small perturbations of its parameters, thus effectively implementing a local search. For trees, bit replacement/refinement is done only for bits inside a node, and once a split is made the node parameters are fixed.

Optionally, an SVM-based loss is used for global optimization. In the SVM loss, we take the sum of C SVM programs, each minimizing a one-versus-all error. Let $y_{ic}=2*\delta(y_i, c)-1$ be binary class labels. The loss is $$L_{SVM} = \frac{1}{2}\|W\|^2 + \Lambda \sum_{c=1}^{C} \sum_{i=1}^{N} \max(1 - y_{i,c}s_i^c, 0) \quad (10)$$

The loss aims for class separation in C independent classifiers. Its advantage lies in the availability of fast and scalable methods for solving large and sparse SVM programs. The loss gradients are $g_i^c = -y_{i,c}$ when example i is a support vector, and 0 otherwise. A first order approximation for $\min_W L_{SVM}$ may be derived for new feature addition, in which the example gradients are $-\alpha_i y_{i,c}$ with $\alpha_i$ the dual SVM variables at the optimum.

Optionally, a softmax loss is used for global optimization, as typically used in neural networks optimization. The softmax loss is:

$$L_{LR} = \frac{1}{2}\|W\|^2 + \Lambda \sum_{i=1}^{N} \log \frac{\exp(s_i^{y_i})}{\sum_c \exp(s_i^c)} \quad (11)$$

This loss provides a direct minimization of the M-class error. The gradients are $g_i^c = \exp(s_i^{y_i})/\Sigma E_c \exp(s_i^c) - \delta(y_i, c)$. Conveniently, it may be extended to a distillation loss, which enables guidance of the classifier using an internal representation of a well-trained CNN classifier.

Optionally, each features column is normalized by the expected count of active examples. Features in a word histogram have significant variance, as some words appear in large quantities in a single image. Without normalization such words may be arbitrarily preferred due to their lower regularization cost—they may be used with lower weights. Denote the column of a feature across all examples by $Col_b^m = (H_{b,1}^m, \ldots H_{b,N}^m)$. Normalizing each features column by the expected count of active examples $L_1(Col_b^m)/L_0(Col_b^m)$ may improve accuracy and convergence speed in many cases.

Exemplary implementations of embodiments of the present disclosure are now presented, demonstrating the performance gains of our techniques by comparison with the Discriminative Ferns Ensemble (DFE) method, ablation studies, fern-tree trade-off experiments, and distillation results. Implementations were created and experimented on 4 publicly available object recognition benchmark datasets: MNIST, CIFAR-10, SVHN and 3-HANDPOSE. The first three are standard recognition benchmarks in grayscale (MNIST) or RGB (CIFAR-10, SVHN), with 10 classes each. 3-HANDPOSE are a 4-class dataset, with 3 hand poses and a fourth class of 'other', and its images contain depth and IR channels. The image sizes are between 28×28 (MNIST) and 36×36 (3-HANDPOSE). The training set size ranges from 50000 (CIFAR-10) to 604000 (SVHN). The training code was written in Matlab, with some routines using code from the external packages. The test time classier was implemented and optimized in C. For ferns an algorithm 1 with SSE operations was implemented. Words are computed for 8 neighboring pixels together, and voting is done for 8 classes at once. For trees a program generating efficient code was implemented of the bit computation loop for a specific tree, so the tree parameters are part of the code. This obtained an acceleration factor of 2X over standard C code. The algorithm was also thread-parallelized over the convolutional tables, with a good speed-up of 3.6x obtained from 4 cores. However, single thread performance was reported and compared to keep the methodology as simple as possible.

The DFE was suggested for classification of 3-HANDPOSE, and may be seen a baseline for CTE, which enhances it in many aspects.

| Dataset | DFE | CTE base | \Opt TH | \Ftr Norm | \WC opt | \Chnls | \Smooth | \Spatial | \Sp. Enforce |
|---|---|---|---|---|---|---|---|---|---|
| MNIST | 0.77 | 0.45 | 0.48 | 0.58 | 0.48 | 0.7 | 0.66 | 0.51 | 0.48 |
| CIFAR-10 | 32.5 | 20.3 | 21.3 | 21.9 | 21.8 | 22.0 | 22.2 | 21.5 | 21.0 |
| SVHN | 11.9 | 6.5 | 7.1 | 7.1 | 10.5 | 13.2 | 7.2 | 13.2 | 7.6 |
| 3-HANDPOSE | 3.2 | 2.3 | 2.1 | 2.5 | 3.5 | 4.4 | 2.7 | 2.2 | 2.2 |

The first two columns in the above table present errors of DFE and CTE on the 4 datasets, using 50 ferns for MNIST, SVHN, 3-HANDPOSE and 100 for CIFAR-10. MNIST was trained with softmax distillation loss (see below for details), and the others with SVM loss. The aggregation area $\{A^m\}_{m=1}^{M}$ were chosen to be identical for all tables in a classifier, forming a centered square occupying most of the image. To enable the comparison, M-class error rates are extracted from DFE. It may be seen that CTE base provides significant improvements of 24-45% error reduction over DFE, with 28% obtained for 3-HANDPOSE, where DFE was originally applied. Note that the CTE base is not the best choice for 3-HANDPOSE. With additional parameter tuning result of 2% may be obtained with 50 ferns, which is an improvement of 38% over DFE.

The accuracy obtained by a CTE is influenced by many small incremental improvements related to structural and algorithmic variations. Columns 3-9 in the above table show the contribution of some ingredients by removing them from the baseline CTE. For MNIST, where the effects are small due to the low error, results were averaged over 5 experiments varying in their random seed, a with seed-induced std of 0.1%. It may be seen that these ingredients consistently contribute to accuracy for non-depth data.

The trade-off between ferns and trees for MNIST and CIFAR-10 is presented in the following table:

| Dataset | Tree form | Error (%) | speed (_S) |
|---------|-----------|-----------|------------|
| MNIST | Fern | 0.45 | 106 |
|  | Depth 3, 4-way splits | 0.43 | 398 |
|  | Depth 6, 2-way splits | 0.39 | 498 |
| CIFAR-10 | Fern | 21.0 | 800 |
|  | Depth 3, 4-way splits | 19.7 | 3111 |
|  | Depth 4, 3-way splits | 19.3 | 3544 |

For MNIST, the results were averaged over 5 experiments, with a seed induced std of 0.028%. It may be seen that trees provide better accuracy. However, the speed cost of using trees is significant, due to the inability to efficiently vectorize their implementation.

Experiments were made with distillation known from a CNN. In such experiments, soft labels are taken from our best CNN model, and a CTE is trained to optimize a convex combination of the standard softmax loss and the Kullback-Leibler distance from the CNN-induced probabilities. This was attempted for MNIST and CIFAR-10 using our best CNN models, providing 0.31% and 8.6% error respectively as distillation sources. For MNIST, this training methodology proved to be successful. Averaging over 5 seeds, the accuracy of a 50-fern CTE optimized for softmax was 0.66% (the std was 0.025%) without distillation, and 0.45% (0.029%) with distillation. For comparison, an SVM-optimized CTE with the same parameters obtained 0.61% (0.04%) error. For CIFAR-10 distillation did not consistently improve the results.

The best accuracy obtainable for a specific speed constraint and vice versa is showed by trade-off or Pareto curves. Since the design space for variations of CNNs and CTE algorithms is huge, and the training time of the algorithms is considerable, it has to be sampled wisely to get a good curve approximation. The presented sampling technique is based on two stages. In stage 1 the most accurate classifiers for CTE and CNN were searched with loose speed constraints, so even slow classifiers were considered. The few top accuracy variants of each architecture were then used as baselines and accelerated them by systematically varying certain design parameters.

The CNN baseline architectures are variations of Deep-CNiN(l,k), with l=3-4 convolutional layers and k=60-100, implying usage of i·k maps at the i-th layer. Higher l, k values provide better accuracy, but such architectures are much slower than 1 CPU millisecond and so they are outside the current domain of interest. Experiments were made with dropout, parametric RELU units, affine image transformations following, and HSV image transformations following. Acceleration of the baseline architectures used three main parameters. The first was reducing parameter k controlling the network width. The second was reduction of the number of maps in the output of the NIN layers. This reduces the number of input maps for the next layer, and may dramatically save computation with relatively small loss of accuracy. The third was raising the convolution stride parameter from 1 to 2. For CTEs, the exploration space includes both ferns and trees. The best performing configurations were then accelerated using a single parameter: the number of tables in the ensemble.

Figure 4:
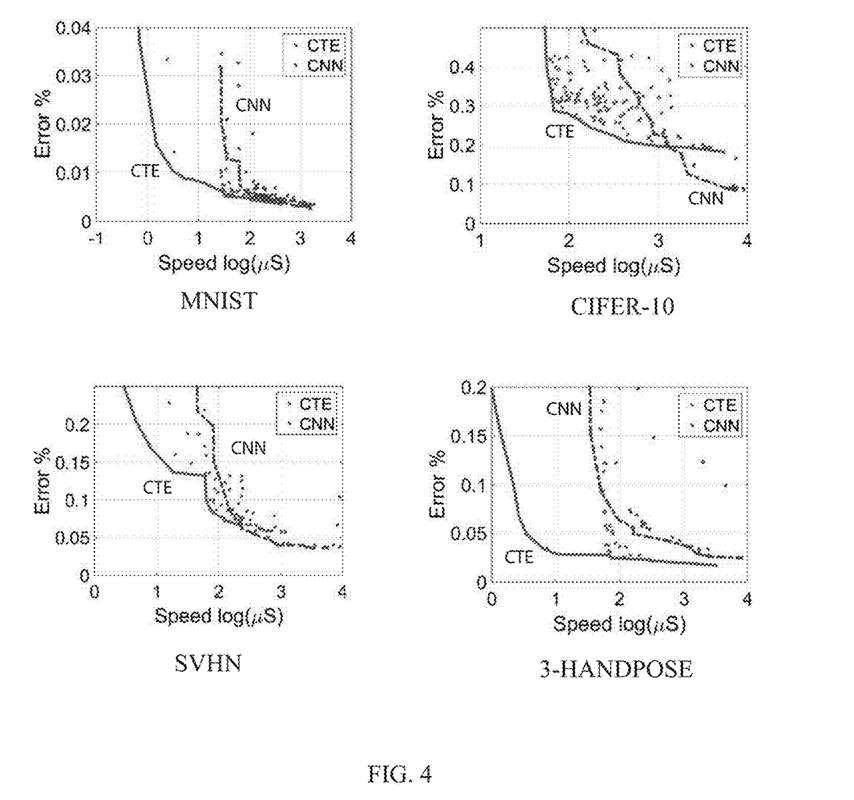
FIG. 4 includes speed-accuracy trade-offs curves for the 4 exemplary datasets, according to some embodiments of the present disclosure.

Reference is also made to FIG. 4, which includes speed-accuracy trade-offs curves for the 4 exemplary datasets, according to some embodiments of the present disclosure. CTE configurations were systematically experimented to obtain accuracy-speed trade-off graphs for the datasets mentioned. Classification speed in microseconds is displayed along the X-axis in log scale with base 10. For all datasets, there is a high speed regime where CTEs provide better accuracy than CNNs. Specifically CTEs are preferable for all datasets when less than 100 microseconds are available for computation. Starting from 1000 microseconds and up CNNs are usually better, with CTEs still providing comparable accuracy for MNIST and 3-HANDPOSE at the 1-10 milliseconds regime. Viewed conversely, for a wide range of error rates, when the error rate is obtainable by a CTE, it is obtainable with significant speedups over CNNs. Some examples of this phenomenon are given in the following table.

| Dataset Error | CTE (_S) | (%) CNN (_S) | speedup |
|---------------|----------|--------------|---------|
| MNIST 0.01 | 4.8 | 63.9 | 13.1_ |
| CIFAR-10 0.25 | 168.8 | 882 | 5.2_ |
| SVHN 0.15 | 18.4 | 88 | 4.7_ |
| 3-HANDPOSE 0.035 | 6.3 | 1250 | 199.3_ |

Note that while a working point of 0.25 error for CIFAR-10 may seem high, the majority of the one-versus-one errors of such a classifier are lower than 0.05, which may be good enough for many purposes.

It is expected that during the life of a patent maturing from this application many relevant systems and methods for image classification will be developed and the scope of the term image classification is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only when the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to an aspect of some embodiments of the present invention there is provided a computer implemented method of training an image classifier using training images data, comprising: receiving training images data, the training images data is labeled according to image classes; selecting a plurality of reference points of the training images; and constructing a set of voting convolutional tables and binary features on a patch surrounding each of the plurality of reference points by: creating a voting table by: creating a first plurality of candidate binary features; calculating a global loss reduction for each of the first plurality of candidate binary features; selecting one of the first plurality of candidate binary features having minimal global loss reduction; and repeating the creating, the calculating and the selecting to select stage-size binary features; and performing a tree split using the voting table by: creating a second plurality of candidate binary features; calculating a combined loss reduction for each stage-split size group of the second plurality of candidate binary features; selecting one of the groups of binary features having a maximal value of the combined loss reduction; and creating a child-directing table using the selected binary features; and repeating the creating and the performing for each of a plurality of calculation stages.

Optionally, the method further comprises: repeating the constructing for each of a plurality of trees.

Optionally, the classifier is used for classifying sample image data by: receiving a sample image from a capture device; for each of a plurality of reference points of the image, producing a codeword by: creating the plurality of calculation stages, each defining the stage split, stage size and the child-directing table; calculating the stage size number of binary features on a patch surrounding the reference point, for a first of the plurality of calculation stages; adding all the binary features to a codeword; using the codeword as an index to the child-directing table to produce an index for a next of the plurality of calculation stages; repeating the calculating, the adding and the using for each of the plurality of calculation stages; and calculating a vote of each of the plurality of codewords to each of a plurality of classes according to a weight matrix; and summing the votes for each of the plurality of classes to determine a classification of the image.

More optionally, the method further comprises: repeating the producing for each of a plurality of trees.

More optionally, the image includes a plurality of channels.

More optionally, the method further comprises, after the receiving: preparing the image to include additional channels.

More optionally, the method further comprises, after the receiving: smoothing at least one channel of the image by a convolution with a triangle filter.

Optionally, the method further comprises: replacing at least one of the binary features with a one of the candidate binary features that optimizes calculation of the codeword.

Optionally, the method further comprises: replacing at least one of the binary features with a binary feature different by a small perturbations of parameters.

Optionally, the constructing includes iterating between gradient based word calculator optimization and global optimization of table weights.

More optionally, the global optimization is based on bit refinement algorithm.

More optionally, the global optimization is based on a support vector machine (SVM) loss.

Optionally, the training images data is an output of a convolutional neural network (CNN) classifier.

According to an aspect of some embodiments of the present invention there is provided a system of training an image classifier using training images data, comprising: a memory storing training images data, the training images data is labeled according to image classes; a code store storing a code; at least one processor coupled to the memory and the program store for executing the stored code, the code comprising: code instructions to receive the training images data; code instructions to selecting a plurality of reference points of the training images; and code instructions to construct a set of voting convolutional tables and binary features on a patch surrounding each of the plurality of reference points by: creating a voting table by: creating a first plurality of candidate binary features; calculating a global loss reduction for each of the first plurality of candidate binary features; selecting one of the first plurality of candidate binary features having minimal global loss reduction; and repeating the creating, the calculating and the selecting to select stage-size binary features; and performing a tree split using the voting table by: creating a second plurality of candidate binary features; calculating a combined loss reduction for each stage-split size group of the second plurality of candidate binary features; selecting one of the groups of binary features having a maximal value of the combined loss reduction; and creating a child-directing table using the selected binary features; and repeating the creating and the performing for each of a plurality of calculation stages.

Optionally, the system further comprises: code instructions to repeat the code instructions to construct a set of voting convolutional tables and binary features, for each of a plurality of trees.

Optionally, the system further comprises: code instructions to replace at least one of the binary features with a one of the candidate binary features that optimizes calculation of the codeword.

Optionally, the system further comprises: code instructions to replace at least one of the binary features with a binary feature different by a small perturbations of parameters.

Optionally, the code instructions to construct a set of voting convolutional tables and binary features includes iterating between gradient based word calculator optimization and global optimization of table weights.

According to an aspect of some embodiments of the present invention there is provided a software program product for training an image classifier using training images data, comprising: a non-transitory computer readable storage medium; first program instructions for receiving training images data, the training images data is labeled according to image classes; second program instructions for selecting a plurality of reference points of the training images; third program instructions for creating a first plurality of candidate binary features; fourth program instructions for calculating a global loss reduction for each of the plurality of candidate binary features; and fifth program instructions for selecting one of the first plurality of candidate binary features having minimal global loss reduction; sixth program instructions for repeating the third, fourth and fifth program instructions to select stage-size binary features; seventh program instructions for creating a second plurality of candidate binary features; eighth program instructions for calculating a combined loss reduction for each stage-split size group of the second plurality of candidate binary features; ninth program instructions for selecting one of the groups of binary features having a maximal value of combined loss reduction; tenth program instructions for creating a child-directing table using the selected binary features; eleventh program instructions for repeating the third, fourth, fifth, sixth, seventh, eighth, ninth and tenth program instructions for each of the plurality of calculation stages; twelfth program instructions for repeating the second, third, fourth, fifth and sixth program instructions for each of the plurality of reference points; wherein the first, second, third, fourth, fifth, sixth, seventh eighth, ninth, tenth, eleventh and twelfth program instructions are executed by at least one computerized processor from the non-transitory computer readable storage medium.

Optionally, the software program product further comprises: thirteenth program instructions for repeating the third, fourth, fifth, sixth, seventh eighth, ninth, tenth, eleventh and twelfth program instructions for each of a plurality of trees; wherein the thirteenth program instructions are executed by the at least one computerized processor.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A computer implemented method of training an image classifier using training images data, comprising:
    receiving training images data, said training images data being labeled according to image classes;
    constructing a set of voting convolutional tables and a set of binary features on two or more pixels of said training images data, for one of a plurality of nodes of a tree hierarchy structure, through:
        creating a voting table to select a group of selected binary features by selecting candidate binary features having minimal global loss reduction; and
        performing a split of the respective node using said voting table by selecting a candidate binary features group and creating a child-directing table, said candidate binary features group and child-directing table are used for a next of said plurality of nodes.

2. The method of claim 1, wherein said creating a voting table includes, for each of the binary features:
    creating a first plurality of candidate binary features;
    calculating a global loss reduction for each of said first plurality of candidate binary features; and
    selecting one of said first plurality of candidate binary features having minimal global loss reduction.

3. The method of claim 1, wherein said performing a tree split includes:
    creating a second plurality of candidate binary features;
    calculating a combined loss reduction for each of a plurality of groups of said second plurality of candidate binary features;
    selecting one of said plurality of groups of binary features having a maximal value of said combined loss reduction; and
    creating a child-directing table using said selected binary features.

4. The method of claim 1, further comprising:
    performing said constructing for each of a plurality of tree hierarchy structures.

5. The method of claim 1, wherein said classifier being used for classifying sample image data by:
    receiving a sample image from a capture device;
    for each of a plurality of sample image patches of said sample image, producing a codeword by iteratively:
        creating said plurality of nodes, each defining said child-directing table;
        calculating a current plurality of binary features on a respective said patch, for one of said plurality of nodes;
        adding said current plurality of binary features to a codeword; and
        using said codeword as an index to said child-directing table to produce an index of a next of said plurality of nodes;
    calculating a vote of each said codeword of each of said plurality of sample image patches, to each of a plurality of classes according to a weight matrix; and
    summing said votes for each of said plurality of classes to determine a classification of said image.

6. The method of claim 5, further comprising:
    repeating said producing for each of a plurality of tree hierarchy structures.

7. The method of claim 5, wherein said sample image includes a plurality of channels.

8. The method of claim 5, further comprising, after said receiving:
    preparing said sample image to include additional channels.

9. The method of claim 5, further comprising, after said receiving:
    smoothing at least one channel of said sample image by a convolution with a triangle filter.

10. The method of claim 1, further comprising:
    replacing at least one binary feature of said set of binary features with one of said candidate binary features that optimizes calculation of said codeword of the respective of said plurality of sample image patches.

11. The method of claim 1, further comprising:
    replacing at least one binary feature of said set of binary features with a binary feature different by a small perturbations of parameters.

12. The method of claim 1, wherein said constructing includes iterating between gradient based word calculator optimization and global optimization of table weights.

13. The method of claim 12, wherein said global optimization is based on bit refinement algorithm.

14. The method of claim 12, wherein said global optimization is based on a support vector machine (SVM) loss.

15. The method of claim 1, wherein said training images data is an output of a convolutional neural network (CNN) classifier.

16. A system of training an image classifier using training images data, comprising:
    a memory storing training images data, said training images data being labeled according to image classes, said memory storing code;
    at least one processor coupled to said memory and said program store for executing said stored code, said code comprising instructions to:
    receive said training images data;
    construct a set of voting convolutional tables and a set of binary features on two or more pixels of said training images data, for one of a plurality of nodes of a tree hierarchy structure, through:
        creating a voting table to select a group of selected binary features by selecting candidate binary features having minimal global loss reduction; and
        performing a split of the respective node using said voting table by selecting a candidate binary features group and creating a child-directing table, said candidate binary features group and child-directing table are used for a next of said plurality of nodes.

17. The method of claim 16, wherein said creating a voting table includes, for each selected candidate binary feature:
creating a first plurality of candidate binary features;
calculating a global loss reduction for each of said first plurality of candidate binary features; and
selecting one of said first plurality of candidate binary features having minimal global loss reduction.

18. The method of claim 16, wherein said performing a tree split includes:
creating a second plurality of candidate binary features;
calculating a combined loss reduction for each of a plurality of groups of said second plurality of candidate binary features;
selecting one of said plurality of groups of binary features having a maximal value of said combined loss reduction; and
creating a child-directing table using said selected binary features.

19. The system of claim 16, further comprising:
code instructions to iteratively perform all said code instructions for each of a plurality of tree hierarchy structures.

20. One or more storage memory embodied with machine-executable instructions executable by more or more processors for training an image classifier using training images data, comprising:
first program instructions for receiving training images data, said training images data being labeled according to image classes;
second program instructions for constructing a set of voting convolutional tables and a set of binary features on two or more pixels of said training images data, for one of a plurality of nodes of a tree hierarchy structure, through:
creating a voting table to select a group of selected binary features by selecting candidate binary features having minimal global loss reduction; and
performing a split of the respective node using said voting table by selecting a candidate binary features group and creating a child-directing table, said candidate binary features group and child-directing table are used for a next of said plurality of nodes.

* * * * *